United States Patent
Berzinis et al.

(10) Patent No.: US 8,903,648 B2
(45) Date of Patent: Dec. 2, 2014

(54) SYSTEM AND METHOD FOR FIELD SAMPLING

(75) Inventors: Michael Berzinis, Tallahassee, FL (US); Mark Milligan, Tallahassee, FL (US)

(73) Assignee: Forestech Consulting, Inc., Tallahassee, FL (US)

( * ) Notice: Subject to any disclaimer, the term of this patent is extended or adjusted under 35 U.S.C. 154(b) by 272 days.

(21) Appl. No.: 13/183,812

(22) Filed: Jul. 15, 2011

(65) Prior Publication Data

US 2013/0018576 A1 Jan. 17, 2013

(51) Int. Cl.
*G01C 21/12* (2006.01)
*G01C 21/00* (2006.01)
*G01C 21/20* (2006.01)

(52) U.S. Cl.
CPC ..................... *G01C 21/20* (2013.01)
USPC ........... 701/412; 701/400; 701/408; 701/409; 701/410; 701/411

(58) Field of Classification Search
CPC ...... G01C 22/006; G01C 21/20; G01C 21/00; G01C 22/00; G10L 21/00; G10L 15/18; G10L 11/00; G10L 17/00; G10L 13/00; G10L 15/00; G10L 15/04; G06F 1/3206; G06F 1/3237; G06F 1/3287; G06F 21/00; G06F 2221/2141
USPC ......... 701/487, 209, 208, 201, 206, 202, 200, 701/412, 420, 117, 408, 447; 345/853, 419; 705/6, 8; 455/456.3, 569.1, 418, 443, 455/456.5, 456.6, 67.11; 702/5; 324/762.09, 62.02, 750.16, 754.23, 324/762.08
See application file for complete search history.

(56) References Cited

U.S. PATENT DOCUMENTS

| | | | |
|---|---|---|---|
| 6,708,114 B1 * | 3/2004 | Milligan | 701/487 |
| 6,897,861 B2 * | 5/2005 | Watanabe et al. | 345/419 |
| 2002/0060701 A1 * | 5/2002 | Naughton et al. | 345/853 |
| 2004/0215389 A1 * | 10/2004 | Hirose | 701/209 |
| 2006/0004515 A1 * | 1/2006 | McDonough | 701/208 |
| 2007/0005238 A1 * | 1/2007 | Adachi | 701/209 |
| 2007/0276709 A1 * | 11/2007 | Trimby et al. | 705/6 |
| 2008/0183541 A1 * | 7/2008 | Wenger et al. | 705/8 |
| 2008/0208445 A1 * | 8/2008 | Bolton et al. | 701/201 |
| 2009/0210148 A1 * | 8/2009 | Jayanthi | 701/206 |
| 2009/0292463 A1 * | 11/2009 | Chase | 701/209 |
| 2010/0057341 A1 * | 3/2010 | Bradburn et al. | 701/201 |
| 2010/0070166 A1 * | 3/2010 | Krzanowski | 701/202 |
| 2010/0198517 A1 * | 8/2010 | Scott et al. | 702/5 |
| 2010/0292914 A1 * | 11/2010 | Vepsalainen | 701/200 |
| 2013/0012234 A1 * | 1/2013 | Tufty et al. | 455/456.3 |

* cited by examiner

*Primary Examiner* — Calvin Cheung
*Assistant Examiner* — Luis A Martinez Borrero
(74) *Attorney, Agent, or Firm* — J. Wiley Horton; Adrienne C. Love (57) ABSTRACT

The field sampling method provides a mobile device, a central memory and a data transfer interface. The mobile device has a main storage, which contains GPS receiver, a mapping program, an external TSP algorithm program and at least one database. The mapping program displays a plurality of sampling point on the user interface of the mobile device. The user has the ability to select a set of sampling points on the user interface. The sampling points are written to a first database. The selected sampling points are processed by the external TSP algorithm program to determine an optimal route. The external TSP algorithm program sends the optimal route to the mapping program. The mapping program displays the optimal route on the screen of the mobile device such that the user can visit points and collect sampling data.

20 Claims, 13 Drawing Sheets

SYSTEM AND METHOD FOR FIELD SAMPLING

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of natural resource management. More specifically, the present invention comprises a method and system for creating an efficient means of field sampling.

2. Description of the Related Art

A forested area is typically maintained by a public or private organization for timber production or some other need of society like water quality or wildlife conservation. In order to manage a forest one must consider the number of trees in a particular set area, or "stand." If a stand is overstocked, the stand may be thinned to allocate resources to remaining crop trees. In order to obtain information for decisions such as thinning, samples are taken from points in a stand since it is impractical to sample all trees and conditions.

Typically, a forester is sent out to a point or multiple points to retrieve data relating to the forest stand. Each point represents a certain area such as a tenth of an acre for statistical sampling.

Global Positioning System ("GPS") technology has allowed for the collection of data in the field. A forester carries a hand-held device and GPS technology provides positional data as he or she navigates the forest stand.

Figure 1:
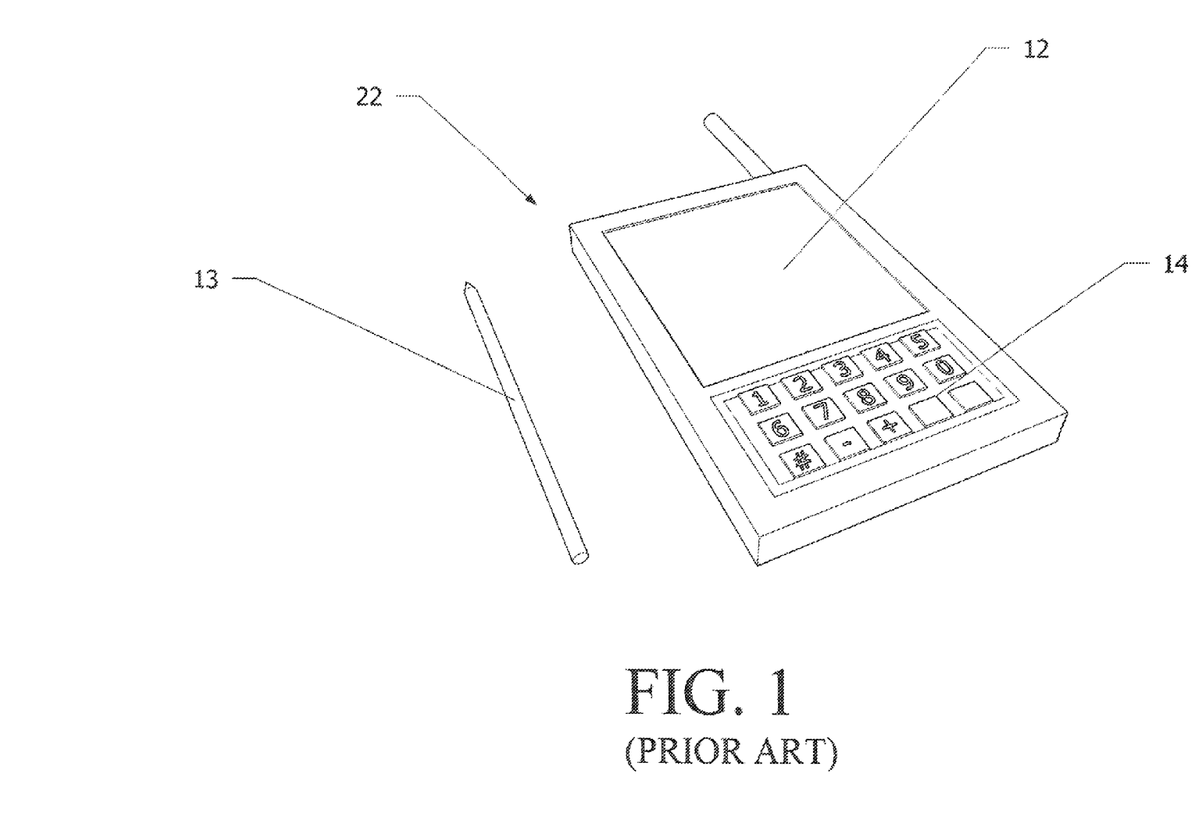
FIG. 1 is a perspective view, showing a prior art device.
Figure 2:
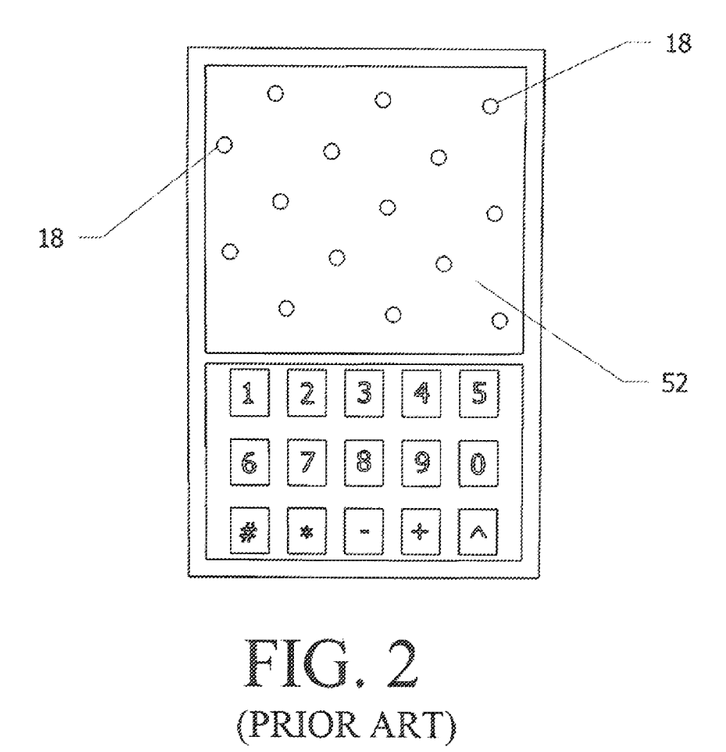
FIG. 2 is a perspective view, showing a prior art graphical user interface on a mobile device.
Figure 3:
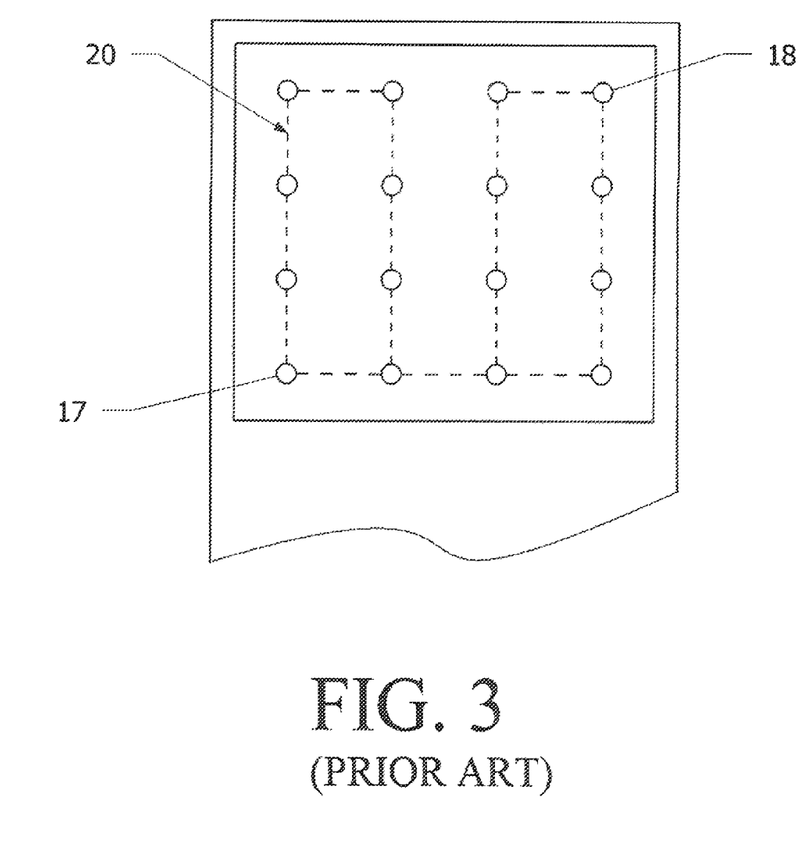
FIG. 3 is a perspective view, showing a prior art graphical user interface with a path of sampling on a prior art mobile device.

FIG. 1 shows a typical mobile device 22 used by a forester to collect data. The device 22 contains screen 12 and entry pad 14. Data can be entered using a stylus 13 on the screen or the entry pad. The graphical user interface displayed on screen 12 is illustrated in FIG. 2. The grid of sample points 18 on first graphical user interface 52 may correspond to the outline of a stand, tract or property. Sample point 18 is a position at which data will be collected for a particular portion of a stand. Typically a forester will need to visit a certain number of sample points 18 per day. As shown in FIG. 3, in order to visit each sample point 18, the forester must map out or choose a path of sampling 20. Generally, the forester will look at the points he wishes to visit and begin walking to each point 18 creating a path of sampling 20 as he or she goes, beginning at a starting point 17. It is desirable that the path of sampling 20 be as short as possible, while still visiting every point exactly once. In most instances the path 20 will pass back across points which have already been visited such as is shown in FIG. 3. Creating a path which maximizes point visits relative to travel is commonly known as the "travelling salesman problem" ("TSP"). TSP is a combinatorial optimization problem which an individual can rarely solve in the field. The end result is that foresters often do not take the most direct path of sampling 20 and thus travel farther and spend more time in the field per point than is necessary.

Therefore what is needed is a system and method of creating an efficient means of field sampling in natural resource management.

BRIEF SUMMARY OF THE INVENTION

The field sampling computerized system allows a user to identify an optimal route for an efficient path of sampling in the field. The user can collect and compile sampling data along the identified optimal route. The field sampling system is generally comprised of a mobile device, a central memory and a data transfer interface. The mobile device has a main storage, such as a hard drive, which contains a mapping program, an external TSP algorithm program and at least one database. The mobile device also contains a GPS receiver which can communicate with the mapping program to incorporate positional data into the field sampling system. The mapping program displays a plurality of sampling points to the user on the screen or first graphical user interface of the mobile device. Then the user has the ability to select set of the sampling points on the user interface. In a preferred method the user circles the desired points to visit on a touch screen. The selected sampling points are written to a first database, preferably an XML database. The selected sampling points are read by the external TSP algorithm program. This program has the ability to process the selected sampling points in order to determine an optimal route to visit each selected sampling point. The optimal route is written to a second database, preferably a final solution database. The external TSP algorithm program is able to send the optimal solution or optimal route to the mapping program. The mapping program displays the optimal route solution on the screen of the mobile device. Upon viewing the optimal route solution with positional data incorporated therein, the user begins to travel to each point in the optimal order, collecting sampling data at each sampling area identified by the sampling point. When the user completes collecting sampling data for the day, the user uploads all collected sampling data to the central memory, preferably a file server, XML server or web server, via a data transfer interface. The central memory can compile and produce various reports utilizing the sampling data provided by users.

REFERENCE NUMERALS TN THE DRAWINGS

| 10 | computer program product | 12 | screen |
| 13 | stylus | 14 | entry pad |
| 16 | stand | 17 | starting sample point |
| 18 | sample points | 20 | actual path of sampling |
| 22 | mobile device | 24 | run icon |
| 26 | step 1 | 28 | step 2 |
| 30 | step 3 | 32 | step 4 |
| 34 | step 5 | 36 | step 6 |
| 38 | step 7 | 40 | step 8 |
| 42 | step 9 | 44 | data transfer interface |
| 46 | main storage | 48 | cancel icon |
| 50 | XML file server | 52 | first graphical user interface |
| 54 | lasso | 56 | start sample point |
| 58 | stop sample point | 60 | second graphical user interface |
| 62 | accept icon | 64 | progress bar |
| 66 | central memory | 68 | third graphical user interface |
| 70 | actual path of sampling | 72 | optimal route |

DETAILED DESCRIPTION OF INVENTION

As described above, hand-held devices are commonly used to provide data relating to a user's position as he or she navigates a forest stand or other area. FIG. 1 shows a prior art mobile device 22, having screen 12, stylus 13 and entry pad 14. First graphical user interface 52 displayed on screen 12 is illustrated in FIG. 2, containing a series of plots 18, within an area or "stand." Sample point 18 is a position at which data will be Collected. Typically a forester is required to visit a series of sample points 18 in order to survey a stand. As described above, the "travelling salesman problem" ("TSP") is the task of determining how to visit each point while traveling the shortest distance (or time). The present computer program product 10 allows a forester to solve the TSP in the field thereby creating a more efficient means of field sampling. While the present description describes the use of computer program product 10 in the foresting industry, the product could be used to collect data in other applications in which sample data would need to be collected from a series of sample points within a certain area in which a straight line can be traveled between points. For example, the present computer program product could be utilized to take water quality samples from different areas or sample points in a large lake. However, it would be impractical to utilize the present method for sample points along roads or infrastructure as a direct path of travel cannot be taken between points.

Figure 4:
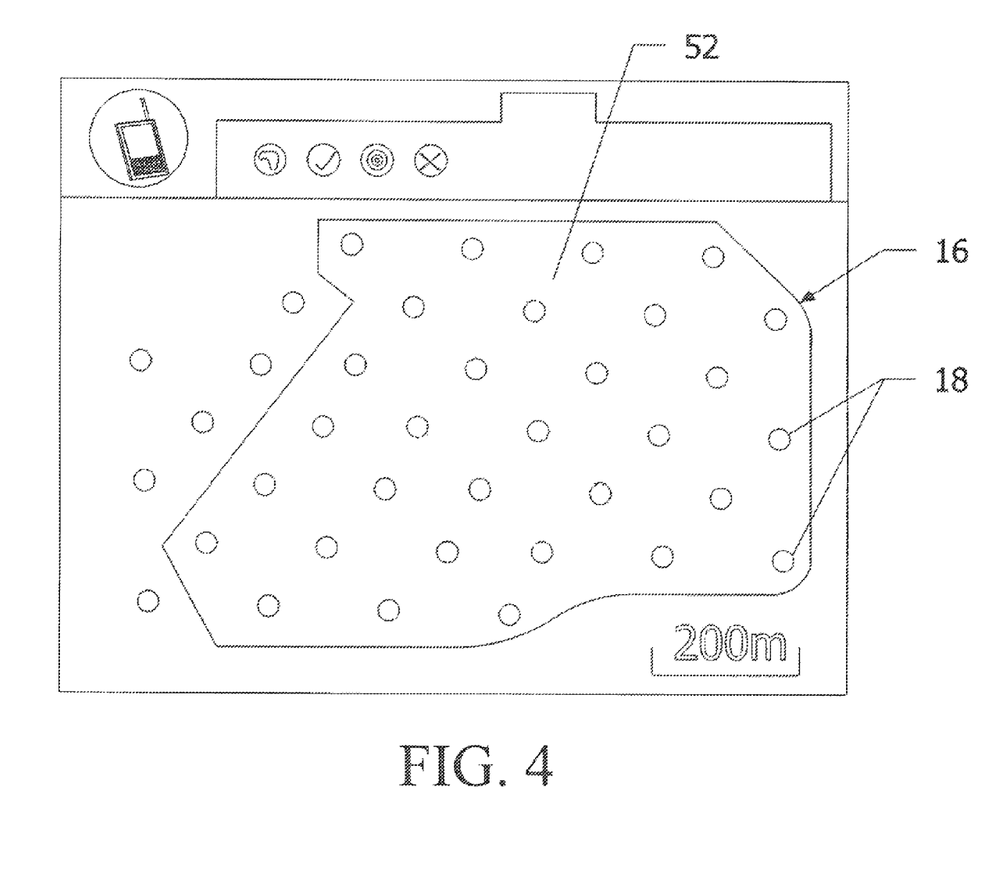
FIG. 4 is a screen shot, showing step 1 of the present invention.

FIG. 4 illustrates the first step of the present computer program product 10 for implementing a method and system for field sampling. The user opens the computer application and the navigation system determines a location for said user via a passive receiver signal from the Global Positioning System ("GPS"). In first graphical interface 52 sample points 18 are overlaid on the relevant portion of map. The graphical user interface displayed in FIG. 4 is a representative sample of a desirable user interface. However, the user interface could assume many different forms. In the present view, there are thirty-one sample points 18 shown over a 77-acre stand 16. Additional outlier points appear outside of the illustrated stand.

Figure 5:
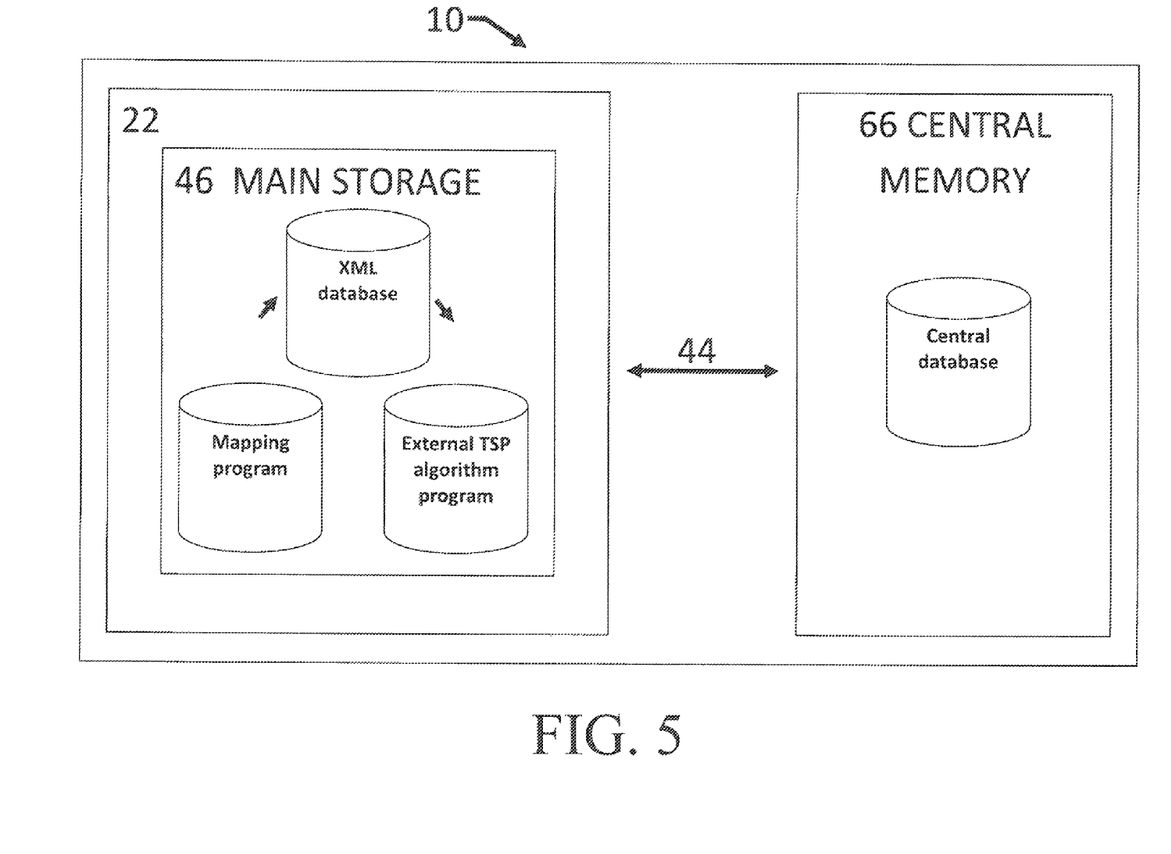
FIG. 5 is a schematic view, showing the software associated with the present invention.

FIG. 5 conceptually illustrates the operation of the system. A user accesses computer program product 10 via mobile device 22. Sample points 18 are created in a mapping program. The mapping program is stored on main storage 46 of device 22. Sample point data is written to an XML list with coordinates and distances between points. Data relating to location or position of sample points is located in main storage 46 of the device 22 or can be accessed in real time via a GPS receiver in device 22. As the user collects data at each sample point 18, the collected data is stored on main storage 46 of mobile device 22. In the preferred embodiment, at the end of use, after all sampling data has been collected the data is downloaded to central memory 66. Central memory 66 is preferably a central computer system or server that accepts data via a wired or wireless data transfer interface 44. A plurality of users would collect data in this manner and download that sampling data to central memory 66. Data transfer interface 44 could be a USB cable, a hardwire connection to a central computer network or wireless connection through the Internet. Central memory 66 could compile sampling data from the plurality of users and produce helpful reports. Reports may include: (1) maps showing all sampling points that have been visited by a user versus those that have not; (2) charts showing the levels of thinning in different areas of the forest stand; and (3) graphs showing collected sampling data on the number of trees in a particular area of the forest stand. As discussed previously, the present system is not be limited to use in a tree stand but also include environmental studies and any other survey or study which requires a person to travel in a direct path between a series of points in order to collect data from each area in which the point is located.

Mobile device 22 can be any device which can interact with the present computer program product 10. It is preferable that the mobile device is rugged due to the nature of the work being performed.

Figure 6:
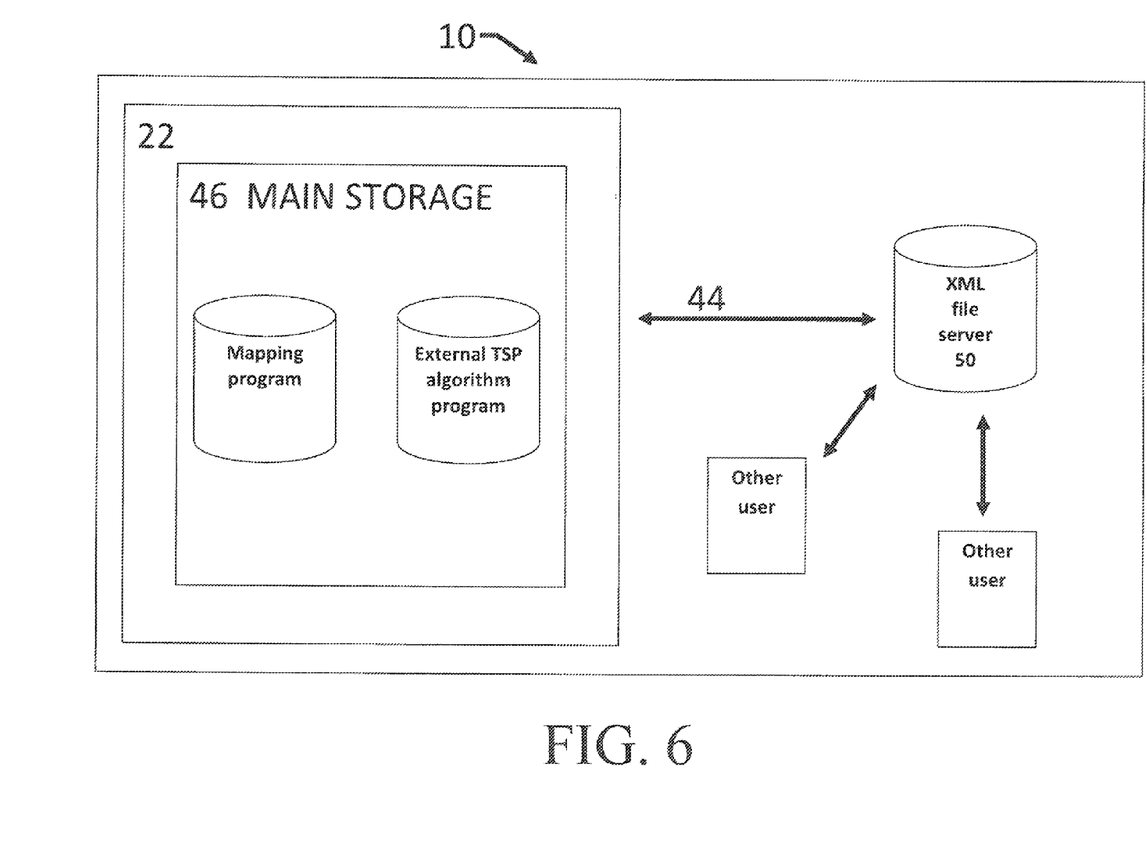
FIG. 6 is a schematic view, showing an alternate embodiment of the software associated with the present invention.

While it is preferable that data is transferred to central memory 66 once collection is complete, mobile device 22 could also communicate with an XML file server 50 in real time from the field as illustrated in FIG. 6. Device 22 would receive and transmit data via a network connection to XML file server 50 in real time relating to position of sample points 18 on the relevant portion of map and data collected from each sample point 18. It would be in this manner that all collected data could be accessed nearly immediately by any user connected to the system.

Figure 7:
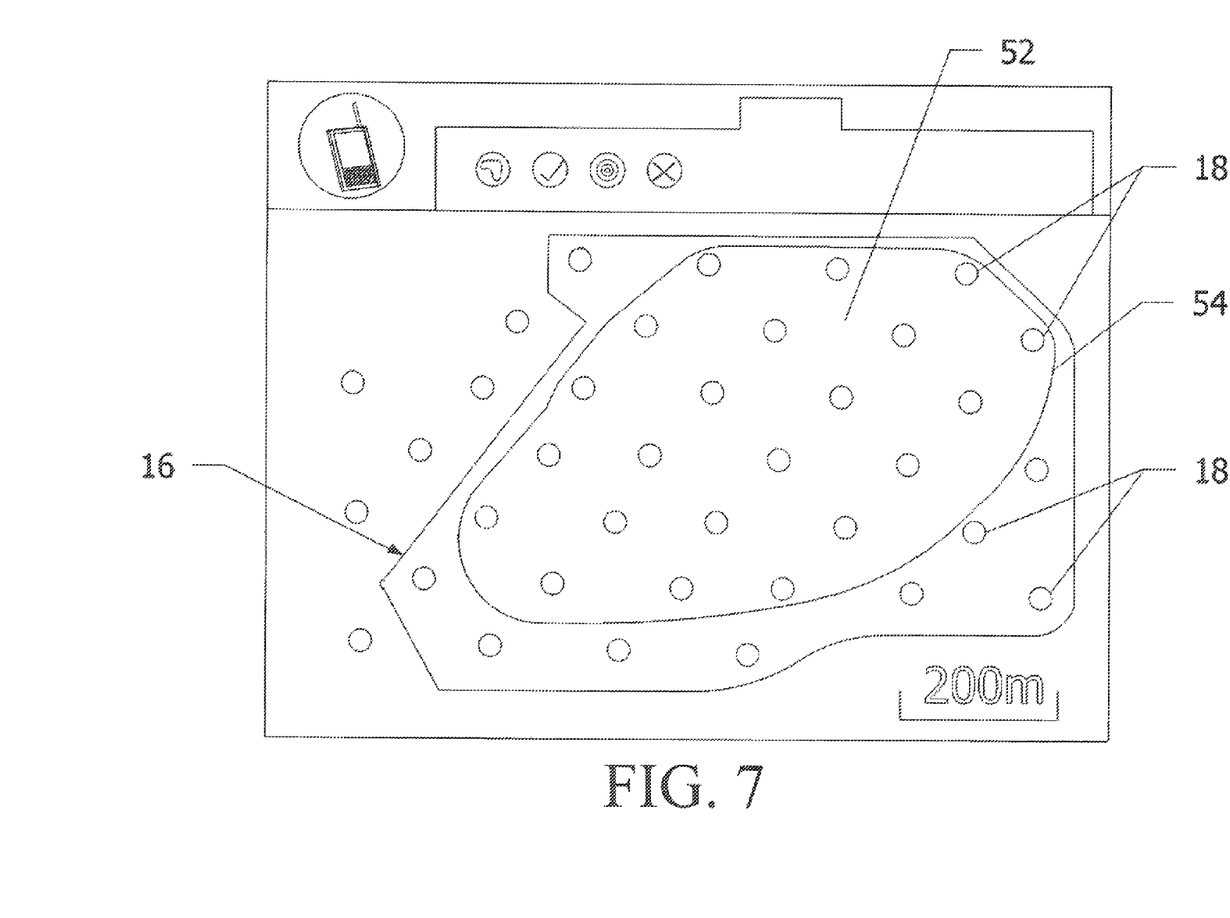
FIG. 7 is a screen shot, showing the selection of the desired sample points displayed on a graphical user interface of the present invention.

The second step taken by the user consists of selecting sample points 18 within a stand 16 to visit, shown in FIG. 7. The user selects a plurality of sample points 18 on first graphical user interface 52 which the user would like to visit in that trip. In the preferred embodiment the user selects the relevant sample points 18 by drawing a lasso 54 around choice sample points 18. While drawing a lasso is the preferable manner of selecting points, sample points 18 could be selected by any known method of entering data on the device, including but not limited to touching and highlighting the choice sample points on a touch screen. FIG. 7 shows lasso 54 around 22 of the 33 sample points identified within the stand. This is shown to clearly illustrate that points can be selected randomly apart from any defined areas, such as a stand. However, typically a forester will select all points within a stand 16 on a given visit.

Figure 8:
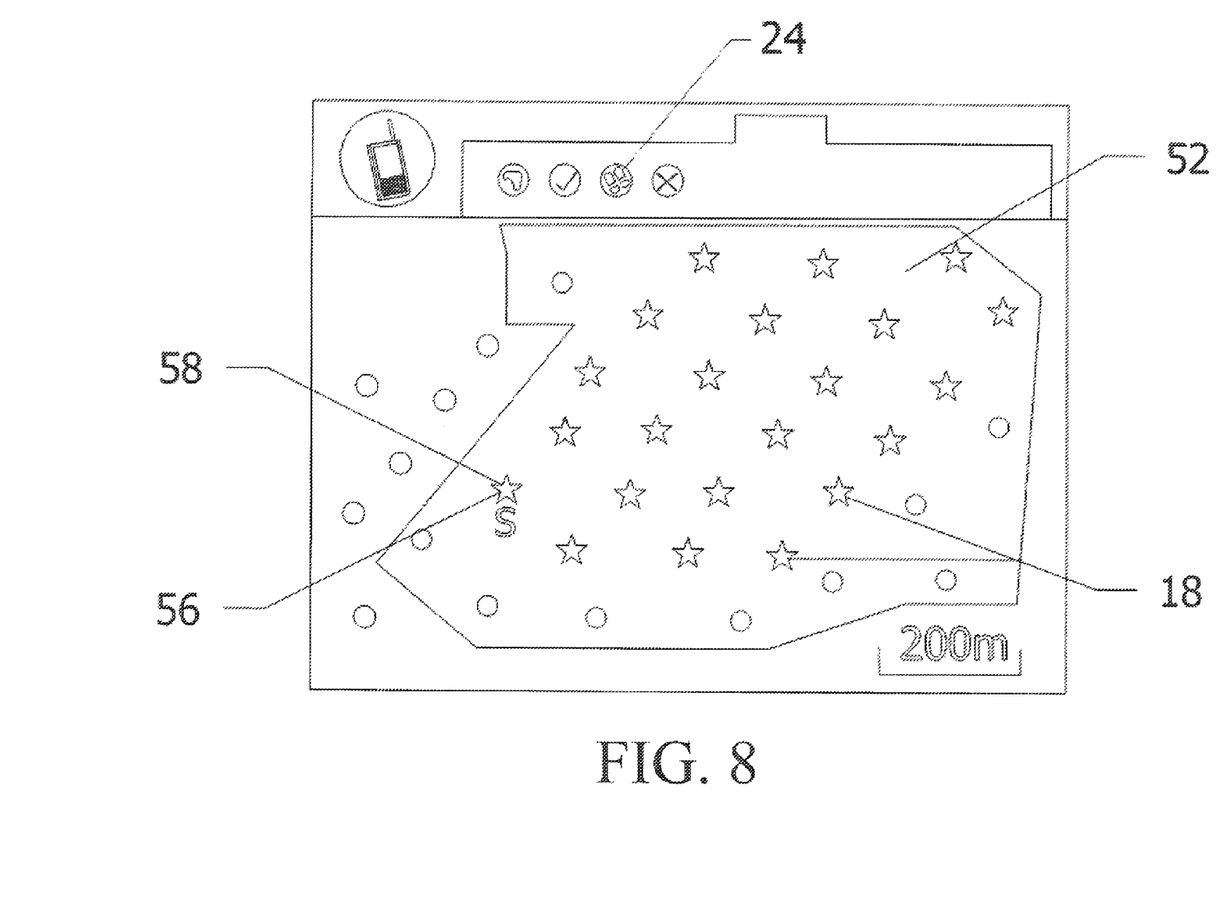
FIG. 8 is a screen shot, showing the start and stop sample points displayed on a graphical user interface of the present invention.

Once sample points 18 are selected, each selected sample point 18 is shown on the screen as a star, as illustrated in FIG. 8. In step 3, the user selects start sample point 56 and stop sample point 58. When the user selects start sample point 56 and stop sample point 58, the points are identified accordingly. In an alternate embodiment, the user can select the current GPS position as the start and stop sample point. Typically, start sample point 56 and stop sample point 58 will be the same sample point. In the present embodiment, start and stop sample points 56, 58 are identified by an "S." Any known method of selecting and identifying sample points can be used. Start and stop sample points 56, 58 are stored temporarily on device 22. Next, to trigger computer program product's 10 determination of the optimal route, the user clicks on the run icon 24, shown as a footprint in FIG. 8.

Figure 9:
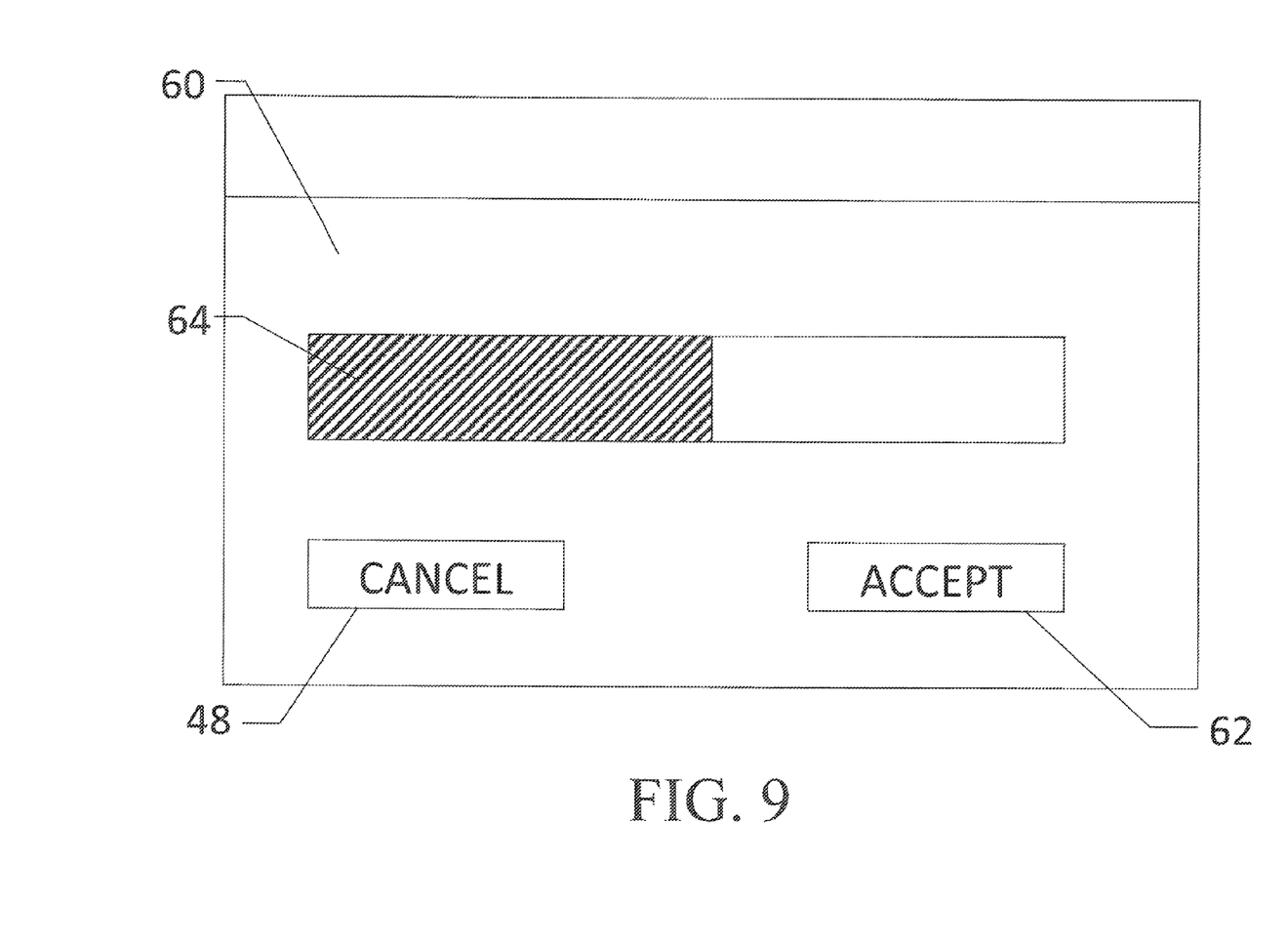
FIG. 9 is a screen shot, showing the progress of determining an optimal route in the present invention.

In step 5, as computer program product 10 runs relevant data through an external TSP algorithm program, a second graphical interface 60 is shown, including progress bar 64, cancel icon 48 and accept icon 62, as illustrated in FIG. 9. User has the option of clicking cancel icon 48 to return to previous screens, or clicking accept icon 62 when the optimal route is calculated. Progress bar 64 shows the relative completion of processing data through external TSP algorithm program.

Figure 10:
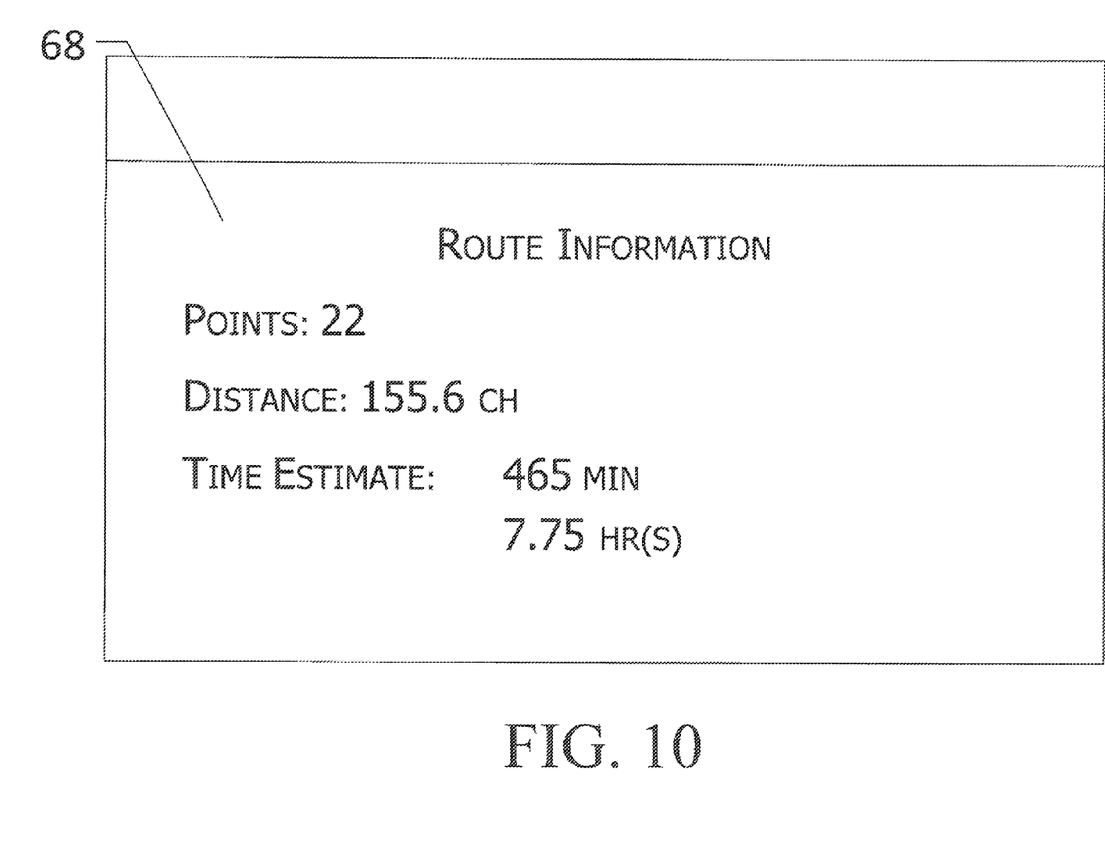
FIG. 10 is a screen shot, showing the optimal route information display of the present invention.

When an optimal route is determined a third graphical user interface 68 shows the number of points, the distance and the estimated time it will take to visit and record data from each sample point selected. This result can be graphically depicted and might look like the display shown in FIG. 10. Distance is shown in chains ("ch") which is a common unit in forestry corresponding to 66-feet. Any known distance measurement could be utilized for different applications of the present invention.

Figure 11:
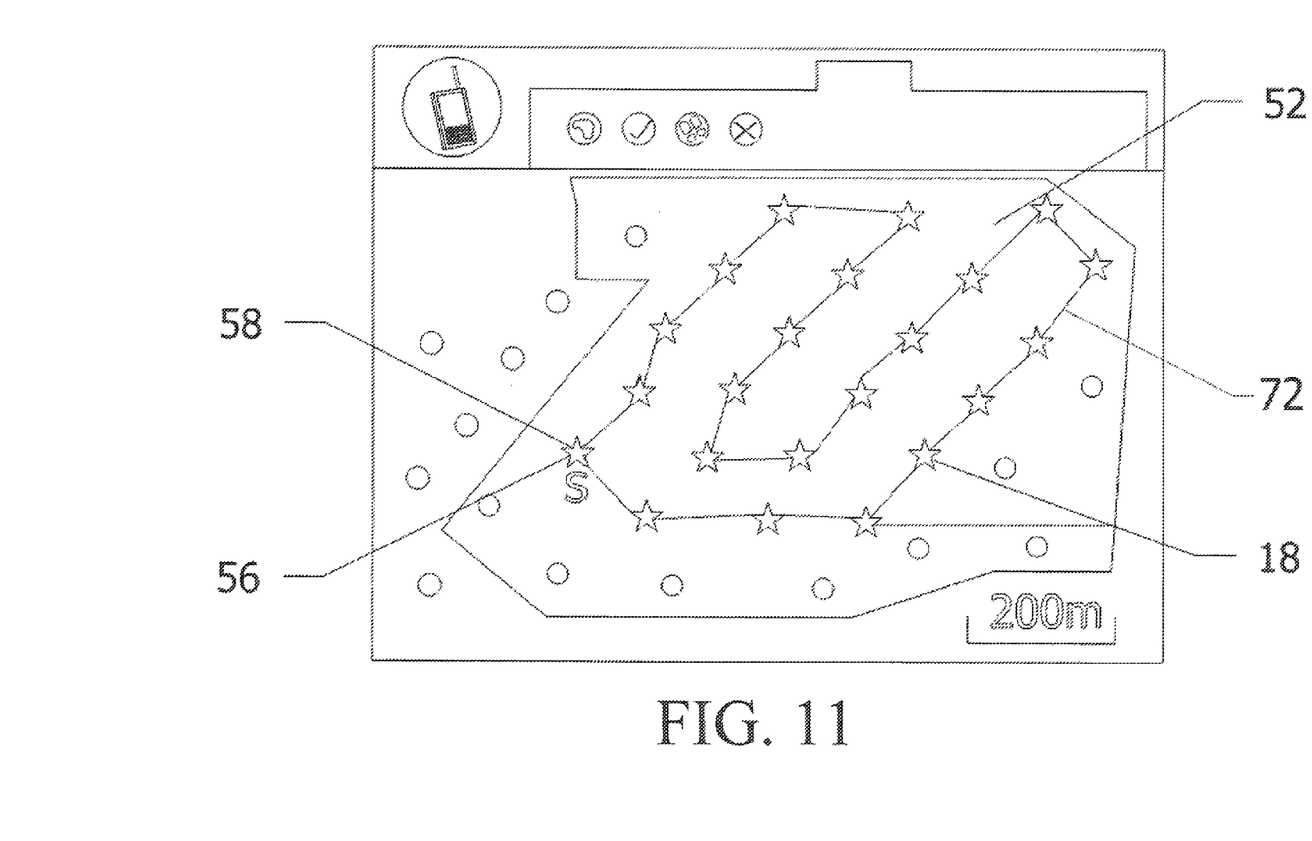
FIG. 11 is a screen shot, showing the optimal route displayed on a graphical user interface over the sample points selected.

As shown in FIG. 11, if the user accepts this optimal route, first graphical user interface 52 will illustrate optimal route 72 connecting each selected sample point 18. Optimal route 72 is shown overlaid onto the map connecting sample points 18 in the order in which the user will need to follow. Optimal route 72 is used as a navigational tool, so that the user can visualize each sample point 18 along the actual path of sampling.

If the user desires to modify the trip by adding or deleting a sample point 18, the user can clear the route. This may occur if the user travels points out of sequence or where a natural barrier is encountered. Once a route is cleared the computer program product 10 returns the user to step 2. The user would select a new set of sample points 18 as desired and the computer program product 10 would again determine the optimal route for these new set of sample points 18, going through the same steps discussed above.

Figure 12:
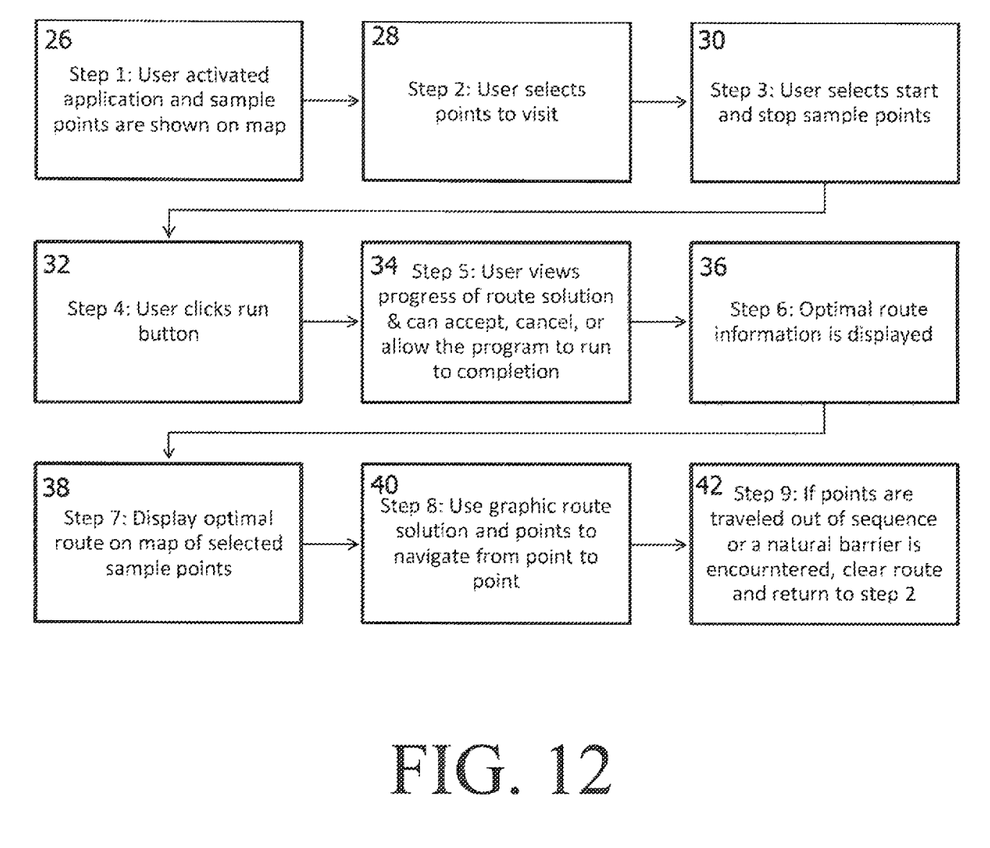
FIG. 12 is a schematic view, showing the steps of the present computer program product from the user operation standpoint.

FIG. 12 is a schematic view showing the steps of the present computer program product from the user operation standpoint. As illustrated and discussed in the preceding paragraphs and figures the user operation begins with step 1 26, wherein the user accesses computer program product 10 via a mobile device 22 and views sample points 18 overlaid on a map on mobile device 22 (FIG. 4): In step 2 28 the user selects sample points to visit, utilizing a stylus 13 from mobile device 22 to drag a lasso around the choice sample points 18 (see FIG. 7). In step 3 30 the user selects a start and stop sample point 56, 58 and in step 4 32 the user clicks on the run icon 24 (see FIG. 8). Step 5 34 consists of viewing a progress bar while computer program product 10 calculates an optimal route solution, the user has the option of cancelling operation, accepting previously found optimal route or allowing progress to complete (see FIG. 9). Upon determination of the optimal route, the user can view the information correlated with the optimal route, step 6 36, including the length of time to complete the route, the distance of the route and the number of sample points within the route (see FIG. 10). In step 7 38 users can view the optimal route 72 overlaid on the map and connecting the sample points (see FIG. 11). In step 8 40 the user utilizes the optimal route solution to navigate from sample point to sample point collecting the relevant data. In step 9 42 if the points are traveled out of sequence, or the user encounters a natural barrier, the user can clear the optimal route 72 and return to step 2 28 to repeat the process.

Figure 13:
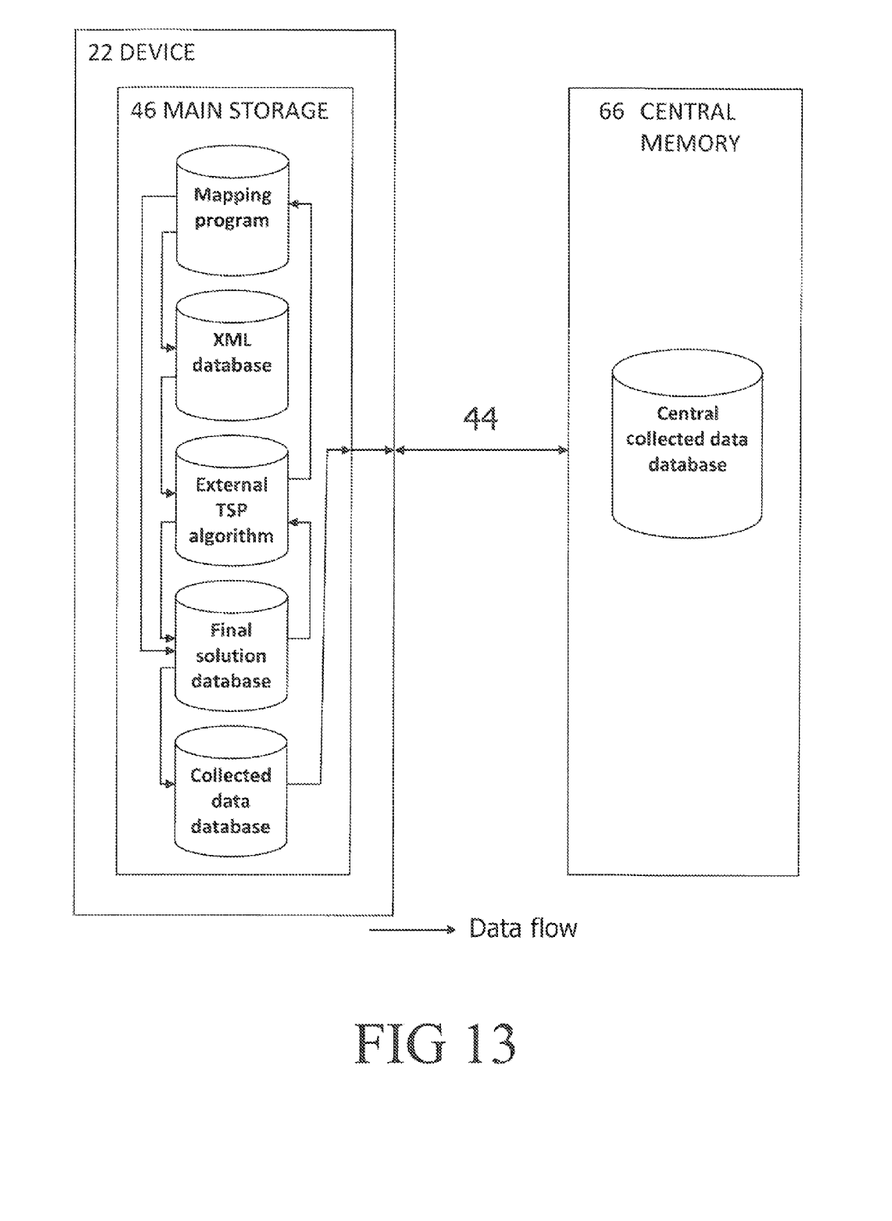
FIG. 13 is a schematic view, showing the steps of the present computer program product data flow.

FIG. 13 is a schematic view showing the data flow of the present computer program product 10 in connection with the hardware. As described above, the user is able to access and choose a set of sample points 18 to visit, which are stored in a mapping program on main storage 46 of device 22. The user inputted choice of sample points 18 are written to an XML list which is stored in an XML database in main storage 46 of device. The XML list includes coordinates and distances between sample points. Next, the XML list stored in the XML database is read by an external TSP algorithm program, which is also stored on main storage 46 of device 22. The external TSP algorithm program processes the data provided and creates XML lists with shorter successive routes as solutions. As the data is run through the external TSP algorithm program the solution progress is shown dynamically to the user on the screen of the device 22 (as described in FIG. 12). The solution XMLs are written to main storage 46, preferably in a second database or final solution database. The external TSP algorithm program instructs the mapping program regarding the optimal route, or shortest solution in the XML list. The mapping program converts the solution to a spatial file and writes the final solution to storage in main storage 46 of device 22. Converting the solution to a spatial file consists of determining an approximate time and distance to complete the set of sample points is calculated. The mapping program renders route lines and point sequence numbers in the display. The user travels from point to point collecting data and inputting that data into device 22, wherein that data is collected and stored in main storage 46, preferably in a database. Finally, collected data (linked to GPS position) is uploaded to central memory 66, housed preferably in a central file server, through a data transfer interface 44.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

The invention claimed is:

1. A computer program product, comprising a non-transitory computer usable medium having a computer readable program code embodied thereon, said computer readable program code adapted to be executed to implement a method of providing an optimal route for a user to collect and compile field sampling data, comprising the steps of:
   a. providing a mobile computing device having a main storage, a user interface and a GPS receiver;
   b. providing a mapping program on said main storage wherein said mapping program displays a plurality of sampling points, by a computer processor;
   c. providing a selection device for selecting a set of sampling points from said plurality of said sampling points on said user interface, by said computer processor;
   d. selecting said set of sampling points on a first database on said main storage, wherein a direct line between each of said sampling points is capable of being established;
   e. providing an external TSP algorithm program on said main storage,
      i. wherein said external TSP algorithm program can processes said set of sampling points to determine a series of paths of sampling between said set of sampling points that sets out said optimal route, by said computer processor; and ii. wherein said paths of sampling are undefined by said user, such that said, optimal route can select said paths of sampling by beginning at a first sampling point to any one of said sampling points within said set of sampling points via said direct line;

f. providing a second database on said main storage to write said optimal route, by said computer processor;

g. wherein said mapping program communicates with said external TSP algorithm program to display said optimal route to said user for use on said user interface, by said computer processor;

h. wherein said user collects said sampling data along said optimal route at said at least two sampling points;

i. providing a central memory, wherein said central memory communicates with said mobile device via a data transfer interface; and j. wherein said user uploads said sampling data collected from said set of sampling points via said data transfer interface to said central memory.

2. The computer program product of claim 1, wherein said user selects said set of sampling points by using a touch screen on said mobile device and circling said set of sampling points.

3. The computer program product of claim 1, wherein said set of sampling points represents a certain area such as a tenth of an acre for statistical sampling from a forest stand.

4. The computer program product of claim 1, wherein said central memory is a file server.

5. The computer program product of claim 1, wherein said central memory is an XML server.

6. The computer program product of claim 1, wherein said mobile device further comprises a GPS receiver, wherein said GPS receiver communicates with said mapping program to incorporate position data into said optimal route.

7. The computer program product of claim 6, further comprising the steps of:
 a. providing said mobile computing device to a plurality of users to collect said sampling data;
 b. providing said data transfer interface to said mobile devices wherein said mobile devices upload said sampling data to said central memory;
 c. compiling said sampling data and said position data on said central memory:
 d. retrieving said sampling data from said central memory.

8. The computer program product of claim 7, wherein said step of retrieving said sampling data from said central memory further comprises an output of a map showing all sampling points visited by said plurality of users and all sampling points not yet visited by said plurality of users.

9. The computer program product of claim 7, wherein said step of retrieving said sampling data from said central memory further comprises an output of a chart showing all data collected from said sampling points regarding thinning of a forest stand.

10. The computer program product of claim 7, wherein said step of retrieving said sampling data from said central memory further comprises an output of a graph showing all data collected from said sampling points regarding the number of trees in an area of a forest stand.

11. The computer program product of claim 7, wherein said step of retrieving said sampling data from said central memory further comprises producing a plurality of reports showing said compiled sampling data.

12. The computer program product of claim 1, wherein said central memory is a web server, wherein said mobile computing device transfers said sampling data in real time to said central memory.

13. A computer program product, comprising a non-transitory computer usable medium having a computer readable program code embodied thereon, said computer readable program code adapted to be executed to implement a method of providing an optimal route for a user to collect and compile field sampling data, comprising the steps of:
 a. providing a mobile computing device having a main storage, a user interface and a GPS receiver;
 b. providing a mapping program on said main storage wherein said mapping program communicates with said GPS receiver to provide a plurality of sampling points containing position data, by a computer processor;
 c. providing a selection device for selecting a set of sampling points from said plurality of said sampling points on said user interface, by said computer processor;
 d. selecting said set of sampling points on a first database on said main storage, wherein a straight line between each of said sampling points is capable of being established;
 e. selecting a starting point and a stopping point on said user interface;
 f. providing an external TSP algorithm program on said main storage,
  i. wherein said computing device processes said starting point, said stopping point and said set of sampling points to determine a series of paths of sampling between said set of sampling points that sets out said optimal route, by said computer processor; and
  ii. wherein said optimal route selects said paths of sampling by beginning at said starting point and selecting any one of said sampling points within said set of sampling points via said straight line;
 g. providing a second database on said main storage to write said optimal route;
 h. wherein said mapping program communicates with said external TSP algorithm program to display said optimal route to said user for use on said user interface, by said computer processor;
 i. wherein said user collects said sampling data along said optimal route at said at least two sampling points;
 j. providing a central memory, wherein said central memory communicates with said mobile device via a data transfer interface; and
 k. wherein said user uploads said sampling data collected from said set of sampling points via said data transfer interface to said central memory.

14. The computer program product of claim 13, wherein said external TSP algorithm calculates said optimal route by presuming a straight line between said set of sampling points.

15. The computer program product of claim 13, wherein said set of sampling points represents a certain area such as a tenth of an acre for statistical sampling from a forest stand.

16. The computer program product of claim 13, wherein said central memory is a file server.

17. The computer program product of claim 16, further comprising the steps of:
 a. providing said mobile computing device to a plurality of users to collect said sampling data;
 b. providing said data transfer interface to said mobile devices wherein said mobile devices upload said sampling data to said central memory;
 c. compiling said sampling data and said position data on said central memory;
 d. retrieving said sampling data from said central memory.

18. The computer program product of claim 17, wherein said step of retrieving said sampling data from said central memory further comprises an output of a map showing all sampling points visited by said plurality of users and all sampling points not yet visited by said plurality of users.

19. The computer program product of claim 13, wherein said central memory is an XML server.

20. The computer program product of claim 13, wherein said central memory is a web server, wherein said mobile computing device transfers said sampling data in real time to said central memory.

\* \* \* \* \*